United States Patent
Malaubier et al.

(10) Patent No.: US 6,431,095 B2
(45) Date of Patent: Aug. 13, 2002

(54) METHOD OF IMPROVING COMBUSTION IN A SYSTEM HAVING A CIRCULATING FLUIDIZED BED, AND A CORRESPONDING SYSTEM

(75) Inventors: François Malaubier, Le Plessis Robinson; Patrick Duche, Massy, both of (FR)

(73) Assignee: ABB Alstom Power Combustion, Velizy Villacoublay (FR)

( * ) Notice: Subject to any disclaimer, the term of this patent is extended or adjusted under 35 U.S.C. 154(b) by 0 days.

(21) Appl. No.: 09/734,682

(22) Filed: Dec. 13, 2000

(30) Foreign Application Priority Data

Dec. 14, 1999 (FR) .............................. 99 15743

(51) Int. Cl.⁷ .............................. F23B 5/00; F23B 7/00; F23C 9/00
(52) U.S. Cl. .................. 110/342; 110/203; 110/205; 110/211; 110/214; 110/243; 110/344
(58) Field of Search .................. 110/203, 204, 110/205, 210, 211, 214, 243, 244, 245, 342, 344, 345

(56) References Cited

U.S. PATENT DOCUMENTS

| 4,616,576 A | * 10/1986 | Engstrom et al. .......... 110/345 |
|---|---|---|
| 4,683,840 A | 8/1987 | Morin |
| 4,824,360 A | 4/1989 | Janka et al. |
| 4,962,711 A | * 10/1990 | Yamauchi et al. .......... 110/347 |
| 5,159,886 A | * 11/1992 | Schaub et al. .............. 110/347 |
| 5,237,963 A | * 8/1993 | Garcia-Mallol ............ 122/4 D |
| 5,325,796 A | * 7/1994 | Garcia-Mallol ............. 110/245 |
| 5,715,764 A | * 2/1998 | Lyngfelt et al. ............. 110/245 |
| 5,911,956 A | 6/1999 | Viel Lamare et al. |

FOREIGN PATENT DOCUMENTS

DE 196 22 299 A1 11/1997

* cited by examiner

*Primary Examiner*—Denise L. Esquivel
*Assistant Examiner*—Kenneth B Rinehart
(74) *Attorney, Agent, or Firm*—Sughrue Mion, PLLC

(57) ABSTRACT

The method is applicable to a combustion system of the circulating fluidized bed type which system includes a hearth and a cyclone, and operates using fuel that is inserted into the bottom of the hearth, where a reducing atmosphere is created and where the fuel undergoes pyrolysis with separation into two phases, namely a solid phase made up of grains of coke, and a gaseous phase containing volatile matter. Provision is made for a primary air injection, secondary air injections, and a late air injection to be performed at different levels. The late air injected between the top of the hearth and the inlet of the cyclone is used to increase the efficiency with which the cyclone collects the particles that reach the top of the hearth unburnt, and thus to increase the combustion efficiency of the system. The system includes air injection means making it possible to implement the method.

15 Claims, 4 Drawing Sheets

FIG. 2
FIG. 3
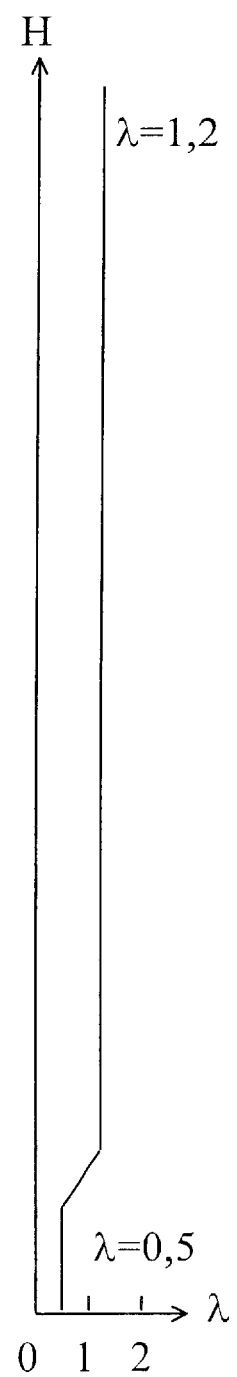
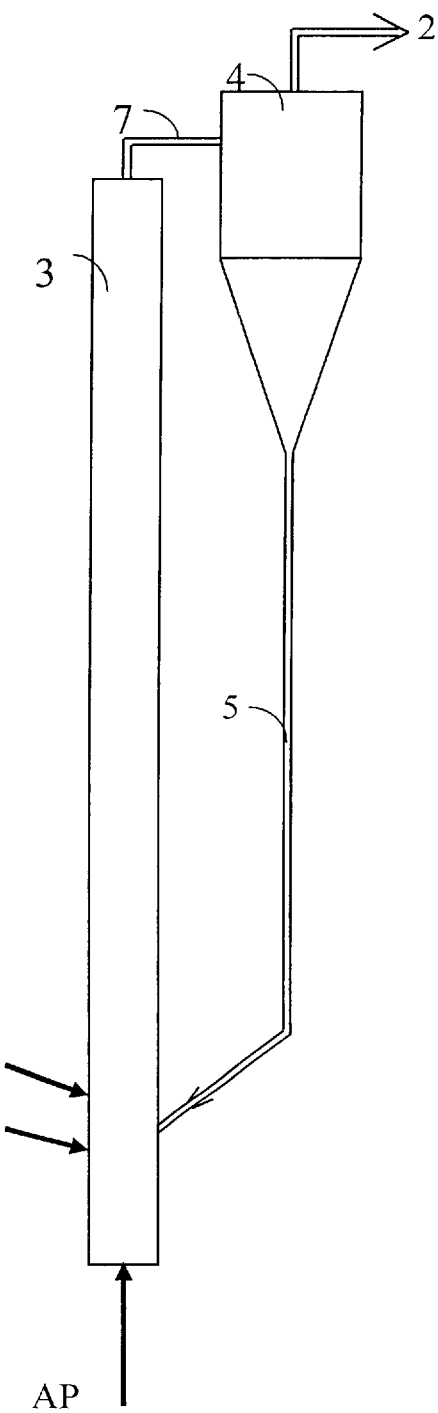

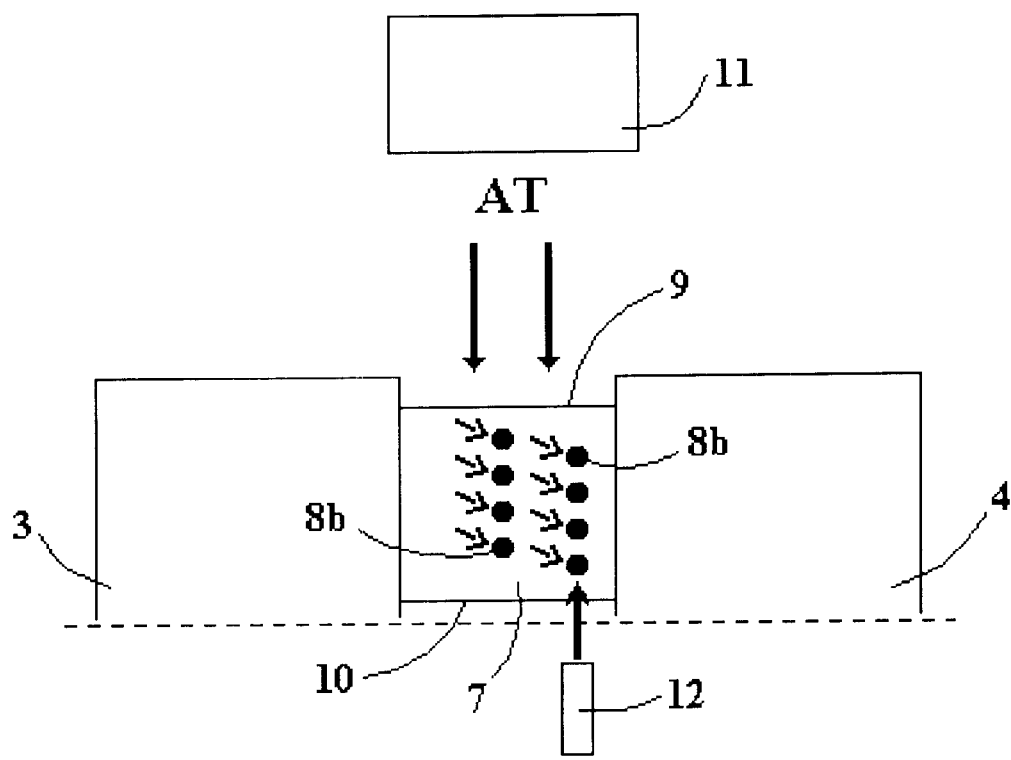

METHOD OF IMPROVING COMBUSTION IN A SYSTEM HAVING A CIRCULATING FLUIDIZED BED, AND A CORRESPONDING SYSTEM

The invention relates to a method of improving combustion in a combustion system having a circulating fluidized bed. It also relates to systems for implementing the method.

BACKGROUND OF THE INVENTION

As is known, this type of system burns crushed solid fuels, liquid fuels, or gas fuels, in particular in fossil-fuel power stations. It suffers from the drawback of producing nitrogen oxides (NOx), and ways are thus sought of limiting the emission of such oxides, in particular by facilitating the release of the nitrogen-containing species in the fuel into an environment that is weakly-oxidizing or even reducing. Such limitation is conventionally obtained by designing hearths in which provision is made to enable the air intake to be staggered at different levels or "stages" over the height of the hearth.

One known solution makes provision to inject "primary" air into a zone situated at the bottom of the hearth, at a flow rate that is determined so as to obtain an excess air coefficient such that a reducing atmosphere is generated therein. "Secondary" air is injected on one or more stages above the bottom zone of the hearth so as to generate an oxidizing zone extending over the remainder of the height of the hearth.

Unfortunately, the known solutions do not provide sufficiently high performance, and an object of the invention is thus to make it possible to obtain a decrease in harmful nitrogen oxide (NOx) emissions in a combustion system having a circulating fluidized bed and associating, in known manner, a hearth and a cyclone, and to achieve said decrease without diminishing the combustion efficiency of the system.

OBJECTS AND SUMMARY OF THE INVENTION

The invention thus provides a method of improving combustion in a system of the circulating fluidized bed type, which system includes a hearth associated with at least one cyclone, in particular for delivering energy to a heat exchanger in an electricity-generating installation. The system is assumed to operate using fuel that is inserted into the bottom of the hearth, where a reducing atmosphere is created and where the fuel undergoes pyrolysis with separation into two phases, namely a solid phase made up of grains of coke and of nitrogen-coke coming from the original fuel, and a gaseous phase containing volatile matter and in particular the remaining nitrogen contained in the original fuel. The particles and the volatile matter rise up inside the hearth where combustion continues while leaving incompletely burnt particles which are sucked up and returned to the bottom of the hearth by cyclone action. The solid particles still containing unburnt carbon are thus given another chance to complete their combustion. "Late" air injection is provided in addition to the primary air injection performed at the bottom of the hearth, and in addition to at least one secondary air injection performed to create a weakly-oxidizing atmosphere in the hearth above its bottom zone in which a reducing atmosphere is created.

In a preferred implementation of the method of the invention, the late air injected upstream from the inlet of the cyclone is guided so as to modify the paths of the solid particles sucked up by cyclone action so as to increase the collection efficiency of the cyclone, and thus increase the combustion efficiency of the system.

In an implementation of the method of the invention, the late air injection of new and hot air is used to improve the combustion of the unburnt gases contained in the flue gases coming from the hearth by means of the additional mixing action that it causes.

In an implementation of the invention, the flow rate of the late air injected upstream from the inlet of the cyclone is chosen to lie in the range approximately 5% of the total air flow rate delivered to the system for combustion purposes to approximately 30% of said total air flow rate.

In an implementation of the method of the invention, the primary, secondary, and late air injections are such that they lead to excess air coefficients $\lambda$ that are respectively about 0.5 in a lower portion of the hearth in the zone in which the atmosphere is a reducing atmosphere, in the range 0.95 to 1.15 in an upper portion of the hearth, situated above the preceding portion, and in which the atmosphere is a weakly-oxidizing atmosphere, and from 1.15 to 1.3 beyond said upper portion, where the late injection produces its effects. It is thus possible to achieve a significant decrease in nitrogen oxide (NOx) emissions.

The invention also provides a combustion system of the circulating fluidized bed type, making it possible to implement the above-described method.

This system includes a hearth associated with at least one cyclone, in particular for delivering energy to a heat exchanger in an electricity-generating installation, and it operates using fuel that is inserted into the bottom of the hearth, where a reducing atmosphere is created and where the fuel undergoes pyrolysis with separation into two phases, namely a solid phase made up of grains of coke containing a nitrogen-coke fraction and coming from the original fuel, and a gaseous phase containing volatile matter and in particular the remaining nitrogen contained in the original fuel, the particles and the volatile matter rising up inside the hearth where combustion continues while leaving incompletely burnt particles which are sucked up and returned to the bottom of the hearth by the cyclone.

According to a characteristic of the invention, the combustion system includes means for performing "late" air injection for injecting late, new and hot air, which means are positioned between the top of the hearth and the inlet of the cyclone, and are organized to act on the paths of the sucked-up particles so as to increase the collection efficiency of the cyclone, means for performing primary air injection into the bottom of the hearth so as to create a reducing atmosphere there, and means for performing secondary air injection to create a weakly-oxidizing atmosphere in the zone of the hearth situated above its bottom zone in which a reducing atmosphere is created.

In the invention, the late air injection means comprise injectors opening out into a duct via which the top of the hearth is connected to the inlet of the cyclone, the injectors opening out into said duct via orifices situated in the duct inside wall, optionally as well as injectors opening out into the duct via orifices provided in the duct through its roof.

In a variant embodiment of the invention, the combustion system comprises late air injectors fed with hot and new air from an air heater of the system, via a circuit that delivers the secondary air for the system.

In another variant embodiment, additive injectors are positioned in late air injector orifices so as to penetrate into the duct via said orifices, and so as to facilitate additive penetration into the mass of flue gases into which the additive is injected.

BRIEF DESCRIPTION OF THE DRAWINGS

The invention, its characteristics, and its advantages are described in more detail in the following description given with reference to the figures in the following list:

FIG. 2 is a graph showing how the excess air coefficient varies in a conventional circulating fluidized bed combustion system, as shown diagrammatically in FIG. 3;

FIG. 4 is a graph showing how the excess air coefficient varies in a circulating fluidized bed combustion system of the invention, as shown diagrammatically in

FIG. 8 is a diagrammatic representation of additional features of the system in accordance with a preferred embodiment of the invention.

MORE DETAILED DESCRIPTION

Figure 1:
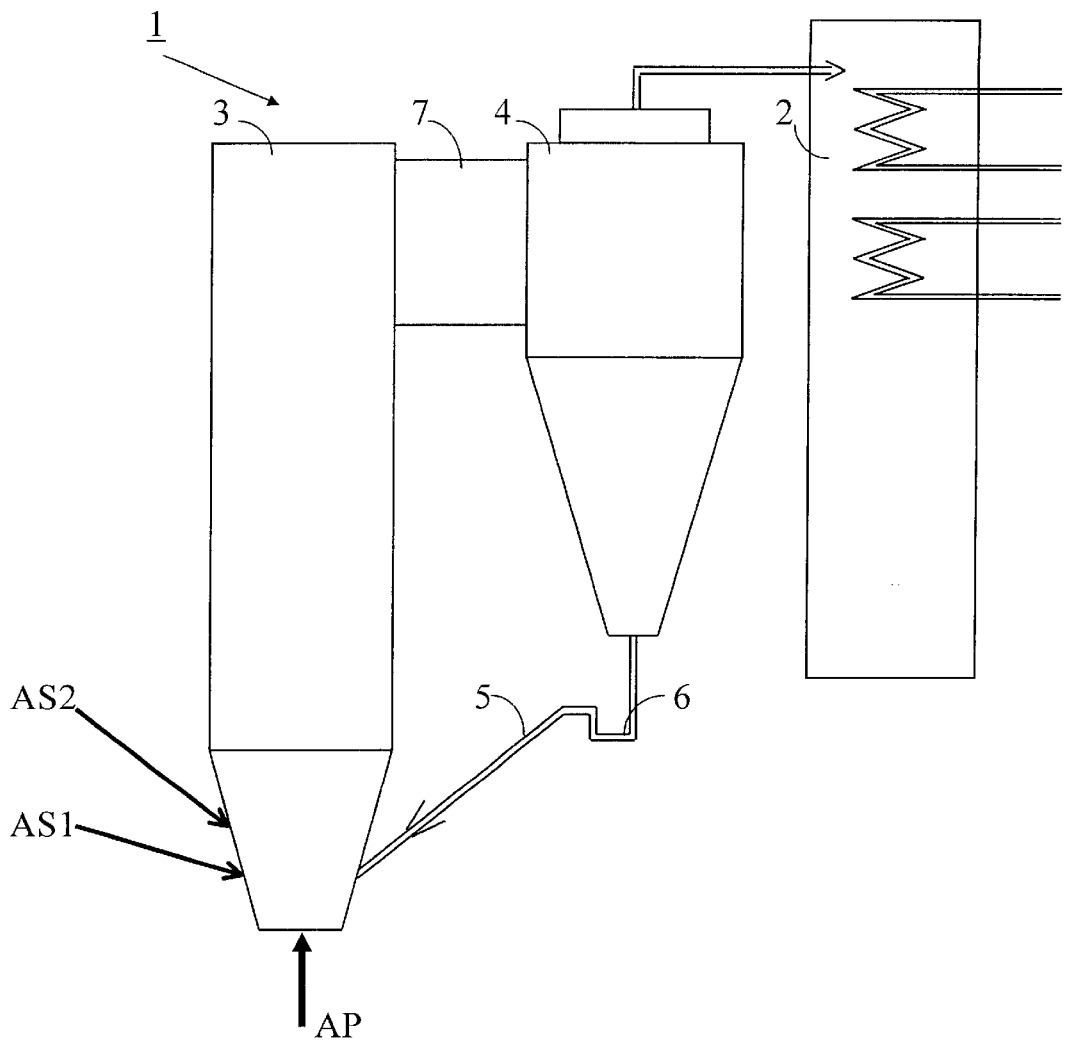
FIG. 1 is a summary diagram showing a combustion system of the type having a circulating fluidized bed, which system makes it possible to deliver energy in the form of heat to a heat exchanger.

A known example of a combustion system 1 of the circulating fluidized bed type is shown diagrammatically in FIG. 1. In this example, the system is assumed to be designed to burn fuel of fossil origin, such as coal or lignite. For example, it is associated with a heat exchanger 2 for delivering energy in form of heat, e.g. in an installation for generating electricity industrially. A hearth 3 and a cyclone 4 constitute the essential elements of the combustion system. They are associated with each other and with the heat exchanger, in known manner, and, in this example, they are assumed to deliver heat energy to a heat exchanger 2.

The flue gases charged with ash particles containing unburnt carbon are centrifuged in the cyclone 4. The particles recovered in this way are re-injected into the bottom portion of the hearth 3 via a siphon trap 6. Primary air is injected from underneath into the lowest portion of the hearth 3, as represented by arrow AP. A reducing atmosphere prevails in this low portion of the hearth, in which the excess air coefficient $\lambda$ is significantly less than 1, as shown in FIG. 2 which shows how the coefficient $\lambda$ varies over the height of the combustion system shown diagrammatically in FIG. 3. In this zone, the fuel is subjected to pyrolysis, and the combustible matter is separated into two phases. One of the two phases is thus constituted by grains of coke and by a fraction of the nitrogen from the original fuel, commonly referred to as "nitrogen-coke". The other phase groups together the volatile matter and in particular the remainder of the nitrogen from the original fuel. As is known, the higher the volatile matter content of the fuel, the larger the fraction of volatile nitrogen. Thus, with fuels constituted by very reactive coals, such as lignite, by sub-bituminous coals or by bituminous coals, the proportion of volatile nitrogen is significantly larger than the proportion of nitrogen-coke.

The grains of coke can remain in the reducing zone situated in the bottom portion of the hearth, and molecular nitrogen $N_2$ is then to be found among the nitrogen-coke combustion products. The time for which the coke grains remain in the reducing zone is essentially a function of the size of each grain. The smallest grains leave the zone rapidly in the form of particles constituted by ash containing unburnt carbon and a remaining amount of nitrogen-coke whose combustion continues in the top portion of the hearth 3. After these particles have been sucked into the cyclone 4 via a duct 7 opening out in the top of the hearth, said particles are burnt even more fully when they are re-injected via the cyclone into the bottom portion of the hearth, via the duct 5.

It is thus important for the collection efficiency of the cyclone to be as high as possible so that optimum recycling is obtained.

Figure 5:
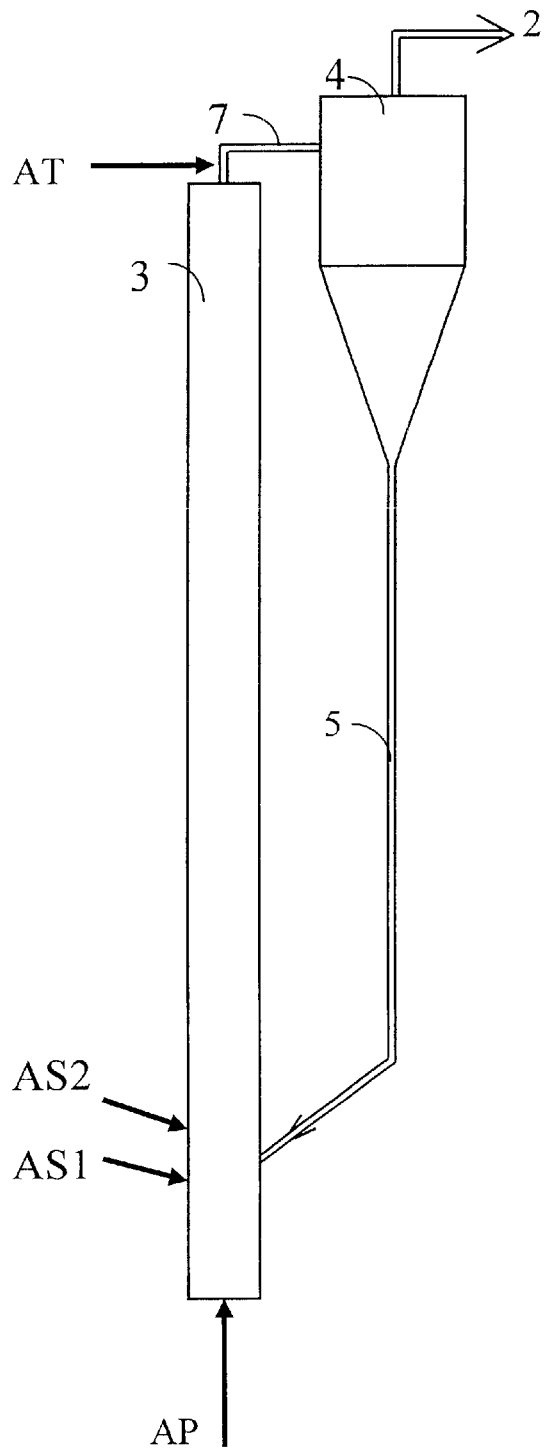
FIG. 5.

The volatile matter, and in particular volatile nitrogen, leaves the reducing zone very rapidly to reach zones which are situated above said reducing zone and into which air is progressively fed, as represented by the staggered secondary air inlets AS1 and AS2 in FIGS. 1, 3, and 5. The staggered injection of secondary air is continued until clearly oxidizing conditions are obtained that lead to an excess air coefficient $\lambda$ that typically lies in the range 1.15 to 1.30, e.g. 1.2 as shown in the graph of FIG. 2. This combustion in an atmosphere that is clearly oxidizing leads more particularly to the production of nitrogen oxides whose main source is volatile nitrogen, in particular when reactive fuels are being burnt, and whose secondary source is the remaining nitrogen-coke contained in the partially unburnt coke grains.

A usual technique for obtaining a primary decrease in nitrogen emissions is to select a small overall excess air in the "free board" portion of the hearth 3, in which portion the solid particles circulate. However, this technique has its limitations because it suffers from the drawback of adversely affecting the operation of the circulating fluidized bed of the hearth 3, in particular in terms of heat exchange with the walls made up of tubes, and of combustion efficiency. By way of example, it has been observed that a decrease in the overall excess air from a coefficient $\lambda 1$ lying in a range 1.25 to 1.30 to a coefficient $\lambda 2$ lying in a rage 1.15 to 1.20 can lead to an advantageous decrease of about 20% in nitrogen oxide (NOx) emissions. However, this decrease is accompanied by a disadvantageous 0.5 point to 1 point decrease in combustion efficiency.

As indicated above, the invention makes it possible to adjust the overall stoichiometry of a combustion system of the above-mentioned type, thereby decreasing nitrogen oxide (NOx) emissions, as explained below.

To this end, and as shown in FIG. 5, "late" air injection inlet AT is provided in the duct 7 upstream from the inlet of the cyclone 4. This specific injection results the air in the hearth 3 being staggered to an even more pronounced extent than with the prior method. It tends to cause a zone of the hearth 3 to exist in which the particles remain for a relatively long time in a weakly-oxidizing atmosphere.

Figure 4:
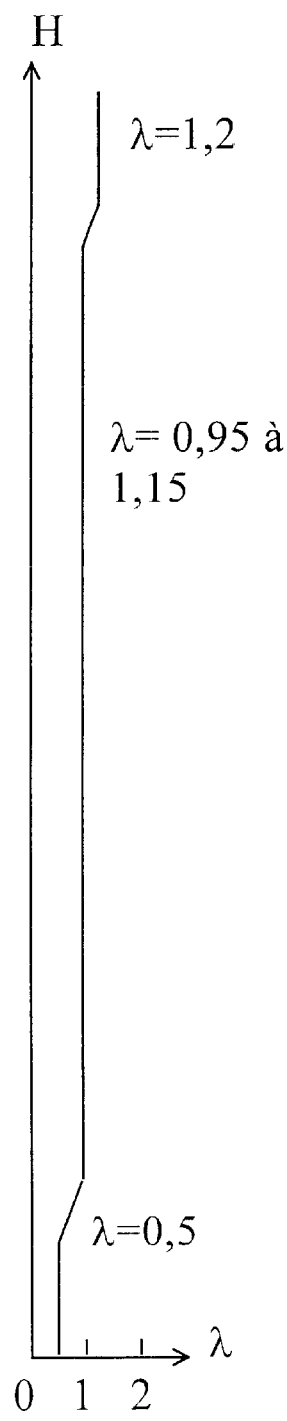

The graph in FIG. 4 shows an example of how the excess air coefficient $\lambda$ varies over the height of a combustion system as shown diagrammatically in FIG. 5, and in which a late injection inlet AT is provided in accordance with the invention. As shown in the top of the graph, a variation in the coefficient $\lambda$ is obtained. In the example proposed, this coefficient has a value 1.2 in the zone in which the late air injection produces its effect, i.e. the same value as it does over almost the entire top portion of the hearth in a conventional combustion system, as shown diagrammatically in FIG. 3.

In a combustion system provided with a late air inlet AT of the invention, the coefficient $\lambda$ remains approximately in the range 0.95 to 1.15 over almost all of the upper portion of the hearth, i.e. over almost all of the portion in which the coefficient $\lambda$ is equal to 1.2 in the graph of FIG. 2, except for the zone in which the effects of the late air injection are felt in the case shown in FIGS. 4 and 5.

Figure 6:
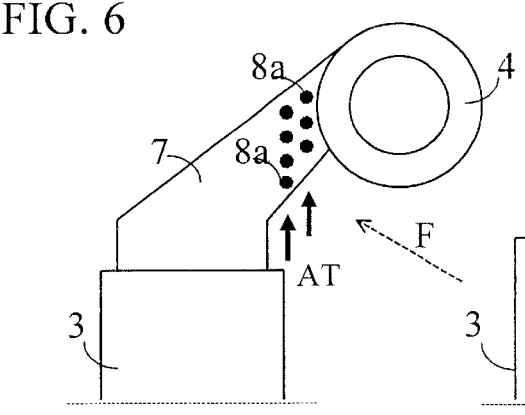
FIGS. 6 and 7 are respectively a top view and a side view looking in the direction F, showing a late air injection configuration for a combustion system of the invention.
Figure 7:
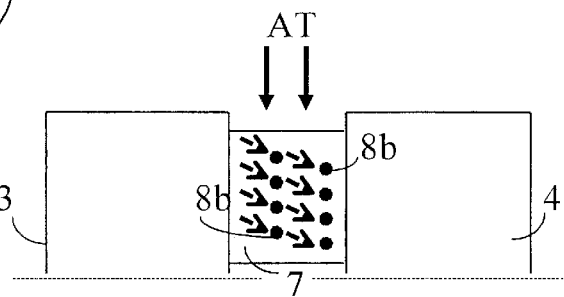

The late injection inlet is implemented as shown in FIGS. 6 and 7 which show a duct 7 interconnecting the top portion of the hearth 3 to the inlet of the cyclone 4, respectively in a top view and a side view looking in the direction F indicated in FIG. 6.

The late air flow rate injected via the inlet AT is determined so as to obtain an optimum excess air coefficient λ in the "free board" portion in which the solid particles are in circulation. For example, the flow rate is chosen to lie in the range approximately 5% of the total combustion air flow rate to approximately 30% thereof.

The late injected air is preferably new and hot air. For example, it has a temperature of about 200° to 400°. For example, it is taken from the secondary air supply circuit, downstream from an air heater 11 in said circuit as shown diagrammatically in FIG. 8. The hot air is injected upstream from the one or more cyclones of the combustion system. It is injected via conventional air injectors (not shown herein) which open out into the duct 7 via orifices 8 shown diagrammatically in FIGS. 6 and 7. These injectors, and in particular their orifices 8 are preferably disposed so that the late air jets modify the paths along which the solid particles travel towards the outside wall of the cyclone, and so that they apply a downward vertical force thereto before they are collected by the cyclone action. This action is generated by a cyclone 4 or optionally by a group of cyclones. The efficiency with which the particles sucked out of the hearth are collected in the cyclone(s) is improved by means of the action of the late air jets on the paths of the particles moving in the duct 7. This improvement in collection efficiency leads to an improvement in solid fuel combustion efficiency.

In the cyclone, vigorous mixing takes place between firstly the flue gases from the hearth, having a low residual oxygen content and optionally a significant unburnt gas (e.g. CO) content, and secondly late new air, thereby making it possible to complete the combustion of the unburnt gases.

In one embodiment, late air injection orifices 8 are situated on the vertical wall of the duct 7 that constitutes the inside wall (duct 7 also has a roof 9 and a floor 10, as diagrammatically shown in FIG. 8). In this example, they are shown organized in two rows, it also being possible for a row of late air injection orifices 8 to be provided on the roof 9 of the duct 7 through which they pass. The shape and the layout of the various orifices 8 are preferably chosen so that the sets formed by the orifices 8 extend transversely to a maximum extent.

In a variant embodiment, provision is made to position additive injectors 12 in at least some of the late air injection orifices 8 as shown diagrammatically in FIG. 8. For example, these additive injectors may be nitrate-reducing additive injection pipes when selective non-catalytic reduction (SNCR) is provided. Injecting late air at high speed then facilitates the additive penetration into the mass of flue gas into which it is injected.

What is claimed is:

1. A method of improving combustion in a system of the circulating fluidized bed type, which system includes a hearth associated with at least one cyclone having an inlet connected to a top of the hearth, and operates using fuel that is inserted into a bottom of the hearth, where a reducing atmosphere is created and where the fuel undergoes pyrolysis with separation into a solid phase made up of grains of coke and of nitrogen-coke coming from the fuel, and a gaseous phase containing volatile matter including remaining nitrogen contained in the fuel, both of the phases rising up inside the hearth where combustion continues while leaving incompletely burnt particles which are sucked up and returned to the bottom of the hearth by cyclone action, said method comprising:

providing primary air injection performed at the bottom of the hearth;

providing at least one secondary air injection performed to create an oxidizing atmosphere in the hearth above the bottom of the hearth where a reducing atmosphere is created; and providing late air injection between the top of the hearth and the inlet of the cyclone in addition to the primary air injection performed at the bottom of the hearth, and in addition to the at least one secondary air injection, thereby modifying paths of the particles sucked up by cyclone action to increase collection efficiency of the cyclone, and thus increase combustion efficiency of the system by burning particles that would otherwise remain unburnt.

2. A method according to claim 1, wherein the late air injection includes injection of new and hot air to improve the combustion of the unburnt gases contained in the flue gases coming from the hearth by means of an additional mixing action caused thereby.

3. A method according to claim 1, wherein a flow rate of the late air is in a range from approximately 5% of the total air flow rate delivered to the system for combustion purposes to approximately 30% of said total air flow rate.

4. A method according to claim 1, wherein the primary, secondary, and late air injections lead to excess air coefficients X that are, respectively:

about 0.5 in a lower portion of the hearth, where the atmosphere is a reducing atmosphere;

in the range 0.95 to 1.15 in an upper portion of the hearth, situated above the lower portion, where the atmosphere is a weakly-oxidizing atmosphere; and from 1.15 to 1.3 in a top portion, situated beyond said upper portion, and affected by the late injection.

5. A combustion system of the circulating fluidized bed type comprising:

at least one cyclone;

a hearth associated with the at least one cyclone, the hearth operating using fuel that is inserted into a bottom of the hearth, where a reducing atmosphere is created and where the fuel undergoes pyrolysis with separation into a solid phase made up of grains of coke and of nitrogen-coke coming from the fuel, and a gaseous phase containing volatile matter and including remaining nitrogen contained in the fuel, the particles and the volatile matter rising up inside the hearth where combustion continues while leaving incompletely burnt particles which are sucked up and returned to the bottom of the hearth by the cyclone, the cyclone having an inlet connected to a top of the hearth;

means for performing late air injection, which are positioned between the top of the hearth and the inlet of the cyclone, and are organized to act on paths of the sucked-up particles to increase collection efficiency of the cyclone;

means for performing primary air injection into the bottom of the hearth to create a reducing atmosphere therein; and means for performing secondary air injection to create an oxidizing atmosphere in a zone of the hearth situated above the bottom of the hearth where the reducing atmosphere is created.

6. A combustion system according to claim 5, wherein the means for performing the late air injection comprise injectors opening out into a duct via which the top of the hearth is connected to the cyclone inlet, the injectors opening out into said duct via orifices situated in an inside wall of the duct.

7. A combustion system according to claim 6, wherein the means for performing the late air injection comprise injectors opening out into the duct via orifices provided in the duct through a roof of the duct.

8. A method according to claim 1, wherein providing the late air injection applies a downward vertical force to the particles.

9. A method according to claim 1, wherein the inlet of said at least one cyclone is connected to the top of the hearth by a duct, and the late air injection is provided via at least one opening in the duct.

10. A method according to claim 9, wherein the duct has two vertical sides, a roof and a floor, and the late air injection is provided via at least one opening in at least one vertical side of the duct.

11. A method according to claim 9, wherein the late air injection is provided via at least one opening in the top of the duct.

12. A method according to claim 9, wherein the late air injection is provided via at least one opening in the top of the duct and via at least one opening in at least one vertical side of the duct.

13. A combustion system of the circulating fluidized bed type comprising:

at least one cyclone;

a hearth associated with the at least one cyclone, the hearth operating using fuel that is inserted into a bottom of the hearth, where a reducing atmosphere is created and where the fuel undergoes pyrolysis with separation into a solid phase made up of grains of coke and of nitrogen-coke coming from the fuel, and a gaseous phase containing volatile matter and including remaining nitrogen contained in the fuel, the particles and the volatile matter rising up inside the hearth where combustion continues while leaving incompletely burnt particles which are sucked up and returned to the bottom of the hearth by the cyclone, the cyclone having an inlet connected to a top of the hearth;

late air injectors positioned between the top of the hearth and the inlet of the cyclone, and organized to act on paths of the sucked-up particles to increase collection efficiency of the cyclone;

primary air injectors position to create a reducing atmosphere at the bottom of the hearth; and secondary air injectors positioned to create an oxidizing atmosphere in a zone of the hearth situated above the bottom of the hearth where the reducing atmosphere is created.

14. A combustion system according to claim 13, wherein the late air injectors comprise injectors opening out into a duct via which the top of the heath is connected to the cyclone inlet, the injectors opening out into said duct via orifices situated in an inside wall of the duct.

15. A combustion system according to claim 14, wherein the late air injectors comprise injectors opening out into the duct via orifices provided in the duct through a roof of the duct.

\* \* \* \* \*